(12) United States Patent
Kastell et al.

(10) Patent No.: US 9,011,218 B2
(45) Date of Patent: Apr. 21, 2015

(54) SYSTEM AND METHOD FOR VENTILATING EXPLOSIVE REGIONS OF AN AIRCRAFT

(75) Inventors: Dirk Kastell, Hamburg (DE); Wilson Willy Casas Noreiga, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 1284 days.

(21) Appl. No.: 12/867,634

(22) PCT Filed: Feb. 11, 2009

(86) PCT No.: PCT/EP2009/000955
§ 371 (c)(1),
(2), (4) Date: Aug. 25, 2011

(87) PCT Pub. No.: WO2009/100897
PCT Pub. Date: Aug. 20, 2009

(65) Prior Publication Data
US 2011/0300786 A1 Dec. 8, 2011

Related U.S. Application Data

(60) Provisional application No. 61/028,962, filed on Feb. 15, 2008.

(30) Foreign Application Priority Data

Feb. 15, 2008 (DE) .......................... 10 2008 009 274

(51) Int. Cl.
*B64D 13/00* (2006.01)
*B64D 37/32* (2006.01)
(Continued)

(52) U.S. Cl.
CPC ................ *B64D 37/32* (2013.01); *B64D 13/08* (2013.01); *B64D 2013/0618* (2013.01); *Y02T 50/44* (2013.01); *Y02T 50/56* (2013.01)

(58) Field of Classification Search
USPC ............................................ 454/76
See application file for complete search history.

(56) References Cited

U.S. PATENT DOCUMENTS 2,362,552 A * 11/1944 Heymann ........................ 454/76
2,917,903 A * 12/1959 Shearer et al. .................. 62/50.4
(Continued)

FOREIGN PATENT DOCUMENTS

| CN | 1894130 | 1/2007 |
|---|---|---|
| GB | 643019 | 9/1950 |

(Continued)

OTHER PUBLICATIONS

Federal Service for Intellectual Property, Patetns and Trademarks (Rospatent), Decision to Grant, Jun. 10, 2013, English-language translation (4 pgs).

(Continued)

*Primary Examiner* — Steven B McAllister
*Assistant Examiner* — Jonathan Cotov
(74) *Attorney, Agent, or Firm* — Wood, Herron & Evans, LLP

(57) ABSTRACT

A system for ventilating an explosion hazard region of an aircraft includes a ram-air channel, which has an air inlet for feeding ambient air into the ram-air channel as well as an air outlet. The ram-air channel is devised to feed air to a device that is to be cooled on board the aircraft. A ventilation line has an air inlet for feeding air flowing through the ram-air channel into the ventilation line as well as an air outlet. The ventilation line is devised to feed air to a region of the aircraft that is to be ventilated. An accumulator is disposed between the ram-air channel and the air inlet of the ventilation line and is devised to convert the dynamic pressure of the air flow conveyed through the ram-air channel at least partially into static pressure for regulating flow through the explosion hazard region.

16 Claims, 2 Drawing Sheets

(51) Int. Cl.
*B64D 13/08* (2006.01)
*B64D 13/06* (2006.01)

(56) References Cited

U.S. PATENT DOCUMENTS

| | | | | |
|---|---|---|---|---|
| 3,501,050 | A * | 3/1970 | Spoecker et al. | 220/88.1 |
| 3,752,422 | A * | 8/1973 | Runnels et al. | 244/118.5 |
| 4,674,704 | A * | 6/1987 | Altoz et al. | 244/1 R |
| 5,655,359 | A * | 8/1997 | Campbell et al. | 60/772 |
| 6,264,137 | B1 * | 7/2001 | Sheoran | 244/53 B |
| 6,651,929 | B2 * | 11/2003 | Dionne | 244/57 |
| 8,602,088 | B2 * | 12/2013 | Solntsev et al. | 165/41 |
| 2002/0152765 | A1 * | 10/2002 | Sauterleute et al. | 62/401 |
| 2005/0115404 | A1 * | 6/2005 | Leigh et al. | 95/11 |
| 2007/0117501 | A1 | 5/2007 | Solntsev et al. | |
| 2008/0315043 | A1 * | 12/2008 | Baumann | 244/53 B |

FOREIGN PATENT DOCUMENTS

| | | |
|---|---|---|
| SU | 1634546 | 5/1991 |
| WO | 2005063569 | 7/2005 |
| WO | WO 2005063569 A1 * | 7/2005 |

OTHER PUBLICATIONS

European Patent Office, International Search Report, PCT/ISA/210, PCT/ISA/237, Jun. 4, 2009.

Chinese Office Action, China Patent Office, Aug. 31, 2012.

\* cited by examiner

SYSTEM AND METHOD FOR VENTILATING EXPLOSIVE REGIONS OF AN AIRCRAFT

CROSS-REFERENCE TO RELATED APPLICATIONS

This application claims priority to International Application No. PCT/EP2009/000955, filed Feb. 11, 2009, under Section 371 ; which in turn claims priority to both U.S. Ser. No. 61/028,962, filed Feb. 15, 2008, and German Application No. 10 2008 009274.6, filed Feb. 15, 2008.

TECHNICAL FIELD

The present invention relates to a system as well as a method of ventilating an explosion hazard region of an air vehicle, in particular of an airplane.

BACKGROUND

On board an aircraft the risk of an explosion in a fuel tank may be minimized by flooding empty tank regions with an inert gas, such as for example nitrogen. The inert gas prevents the formation of an explosive gas mixture above the fuel surface. In aircraft regions adjoining a fuel tank, however, inerting by means of an inert gas is generally not possible. For this reason, such explosion hazard regions are conventionally insulated by means of a foil. Furthermore, components that are disposed in these regions and might produce a spark or develop a high surface temperature while in operation are of an explosion-proof design and provided with special insulation. Finally, explosion hazard aircraft regions are intensively ventilated and drained, is wherein air exchange rates of 3 to 5 per minute are to be realized.

Typically, for ventilating explosion hazard aircraft regions separate systems are provided, which are so designed that in all operating situations of the aircraft they guarantee an adequate ventilation and drainage of the explosion hazard aircraft regions as well as an adequate cooling of thermally loaded components that are disposed in the explosion hazard aircraft regions. Known ventilation systems comprise for example a ram-air channel, through which during cruising of the aircraft air is directed into an aircraft region that is to be ventilated to reduce the risk of explosion. During operation of the aircraft on the ground, on the other hand, a fan ensures an adequate supply of air into the aircraft region to be ventilated. The installation of a separate ventilation system leads to additional cost, increased weight and a need for additional energy to drive the fan, which is operated electrically or by means of air drawn off from the engine.

SUMMARY OF THE INVENTION

The underlying object of the invention is to provide a system, which operates reliably, is of a simple construction and saves weight and installation space, for ventilating an explosion hazard aircraft region. A further underlying object of the invention is to indicate a corresponding method of ventilating an explosion hazard aircraft region.

This object is achieved by a system for ventilating a region of an aircraft having the features described below as well as by a method of ventilating a region of an aircraft having the features described below.

A system according to the invention for ventilating an explosion hazard region of an aircraft comprises a ram-air channel having an air inlet for feeding ambient air into the ram-air channel. The air inlet of the ram-air channel may be designed for example in the form of an NACA (National Advisory Committee for Aeronautics) inlet. The ram-air channel may moreover, where necessary, comprise a diffuser. An air outlet of the ram-air channel is used to remove air, after it has flowed through the ram-air channel, from the ram-air channel back into the environment. The ram-air channel is devised to feed cooling air to a device on board the aircraft that is to be cooled. The device to be cooled may be for example part of the aircraft cooling system. Preferably, the ram-air channel of the ventilation system according to the invention is used to feed cooling air to condensers of a refrigerating machine of the aircraft cooling system. In principle, the air flowing through the ram-air channel may be fed directly as cooling air to the device to be cooled and is blown for example over the device to be cooled. Alternatively, however, the cooling energy of the air flowing through the ram-air channel may be transferred to the device to be cooled by means of a suitable device, such as for example a heat exchanger.

The ventilation system according to the invention further comprises a ventilation line, which branches off from the ram-air channel and has an air inlet for feeding the air flowing through the ram-air channel. An air outlet of the ventilation line is connected to a region of the aircraft that is to be ventilated, for example to an explosion hazard region of the aircraft. Air diverted from the ram-air channel may therefore be fed through the ventilation line to the aircraft region that is to be ventilated. In other words, in the ventilation system according to the invention no additional ram-air channel is required for ventilation. Instead, only one ram-air channel is used to feed ambient air to a device to be cooled on board the aircraft and to feed ventilating air into a region of the aircraft that is to be ventilated. The system according to the invention is therefore an integrated cooling- and ventilation system. It is therefore possible to dispense with the provision of a separate ventilation device, thereby leading to advantageous reductions in weight and installation space. In the aircraft region to be ventilated a further thermally loaded device, such as for example an electronic component or the like, may be disposed. The air fed through the ventilation line to the aircraft region to be ventilated is then used simultaneously to cool the thermally loaded component.

In the system according to the invention for ventilating an explosion hazard region of an aircraft, an accumulator is disposed between the ram-air channel and the air inlet of the ventilation line and is devised to convert the dynamic pressure of the air flow conveyed through the ram-air channel at least partially into static pressure. By means of the static pressure that has built up in the accumulator, pressure losses in the air flow that arise in the course of flow through the ventilation line may be compensated in an advantageous manner. It is consequently possible to achieve a constant volumetric air flow through the ventilation line as well as a uniform flow profile upon exiting of the air from the air outlet of the ventilation line.

Compared to a dynamic arrangement, in which air flowing through a ram-air channel is diverted from the ram-air channel through a ventilation line without provision of an accumulator, in the system according to the invention it is possible to dispense with additional flow control devices, such as for example a ram-air channel outlet valve or a particularly powerful fan disposed in the ram-air channel to guarantee an adequate air flow through the ventilation line. Furthermore, in the system according to the invention for ventilating an explosion hazard region of an aircraft the air conveyed into the ventilation line does not have to be removed from the core flow—which has a high static pressure—of the air flow conveyed through the ram-air channel. Instead, air that is flowing along the ram-air channel wall and has a high rate of flow but a low static pressure may be diverted from the ram-air channel, fluidically "conditioned" in the accumulator and finally fed to the ventilation line. As a result, a disturbance of the air flow in the ram-air channel is avoided, while enabling an adequate air feed into the ventilation line.

Preferably, the accumulator is so designed that by means of the conversion of at least a part of the dynamic pressure of the air flow conveyed through the ram-air channel into static pressure a pressure loss arising in the ventilation line is substantially compensated. In principle, an increase of the mass flow in the accumulator leads to an increase of the static pressure in the accumulator. Consequently, a static pressure generated in the accumulator may be all the higher, the larger an air inlet of the accumulator is designed and the further the air inlet of the accumulator reaches into the air flow conveyed through the ram-air channel. The design of the accumulator may therefore be advantageously adapted to the design of the ventilation line. For example, a ventilation line, which is designed in the form of a long narrow nozzle and during the flow through which high pressure losses arise, may be combined with an accumulator having a relatively large air inlet. This makes it possible for the ventilation line designed in the form of a nozzle to be loaded with a sufficiently high static pressure. The accumulator may also be designed in such a way that it enables flow control. For example, by means of a suitable design of the accumulator a steadying of the flow and hence a better rectification of the flow into the ventilation line may be realized.

As already mentioned, the accumulator has an air inlet, through which air flowing through the ram-air channel may enter the accumulator. The air inlet of the accumulator is in this case so dimensioned that in the explosion hazard region of the aircraft that is to be ventilated an air exchange rate of 5 times per minute is achieved. The accumulator preferably comprises an air scoop that is incorporated into a wall of the ram-air channel.

An air inlet area of the accumulator may be aligned substantially at right angles to the direction of flow of the air flowing through the ram-air channel and face towards the air flow. This enables an adequate air mass flow into the accumulator.

In the ram-air channel a fan may be disposed, which especially during operation of the aircraft on the ground ensures a proper flow through the ram-air channel. The fan is preferably positioned upstream of the accumulator in the ram-air channel.

In a preferred embodiment of the ventilation system according to the invention, the region of the aircraft to be ventilated is provided with at least one air discharge opening for removing the air that is fed through the ventilation line to the region that is to be ventilated. The at least one air discharge opening may connect the region of the aircraft to be ventilated to the environment and be disposed for example in an outer skin of the aircraft. Preferably, the at least one air discharge opening is disposed in a region of the aircraft outer skin that is adjacent to the air outlet of the ram-air channel. The high air exit speed at the air outlet of the ram-air channel generates a vacuum in the environs of the ram-air channel outlet and consequently induces an injection flow that promotes the removal of the air from the region of the aircraft that is to be ventilated. Thus, by virtue of the arrangement of the at least one air discharge opening of the region to be ventilated in the immediate vicinity of the air outlet of the ram-air channel a proper removal of the purging air, which is fed to the region to be ventilated, from the region to be ventilated is guaranteed.

In a method according to the invention of ventilating an explosion hazard region of an aircraft, ambient air is fed through a ram-air channel to a device to be cooled on board the aircraft, for example condensers of a refrigerating machine of an aircraft air-conditioning system. Air flowing through the ram-air channel is further fed through a ventilation line to a region of the aircraft that is to be ventilated. The region of the aircraft that is to be ventilated is for example an aircraft region that is adjacent to a fuel tank and needs to be adequately ventilated to prevent the formation of an explosive gas mixture. In addition thereto, the air fed to the region to be ventilated may also be used as cooling air to cool a thermally loaded component, for example an electronic component or the like, that is disposed in the region to be ventilated. Prior to entry of the air into the ventilation line, the dynamic pressure of the air flow conveyed through the ram-air channel is converted at least partially into static pressure in an accumulator, which is disposed between the ram-air channel and an air inlet of the ventilation line.

Preferably, by means of the conversion of at least a part of the dynamic pressure of the air flow conveyed through the ram-air channel into static pressure a pressure loss arising in the ventilation line is substantially compensated.

Preferably, during operation of the aircraft on the ground the air flow through the ram-air channel is generated by means of a fan disposed upstream of the accumulator in the ram-air channel.

The air fed through the ventilation line to the region of the aircraft to be ventilated is extracted from the region to be ventilated into the environment through at least one air discharge opening preferably as a result of an injection flow that is induced by means of an air flow exiting from an air outlet of the ram-air channel.

BRIEF DESCRIPTION OF THE DRAWINGS

A preferred embodiment of a system according to the invention for ventilating an explosion hazard region of an aircraft is now described in detail with reference to the accompanying diagrammatic drawings, which show FIG. 1 an overview representation of a system for ventilating an explosion hazard region of an aircraft, and FIG. 2 a three-dimensional detail view of a ventilation line, which branches off from a ram-air channel, and an accumulator disposed between the ram-air channel and the air inlet of the ventilation line.

DETAILED DESCRIPTION

Figure 1:
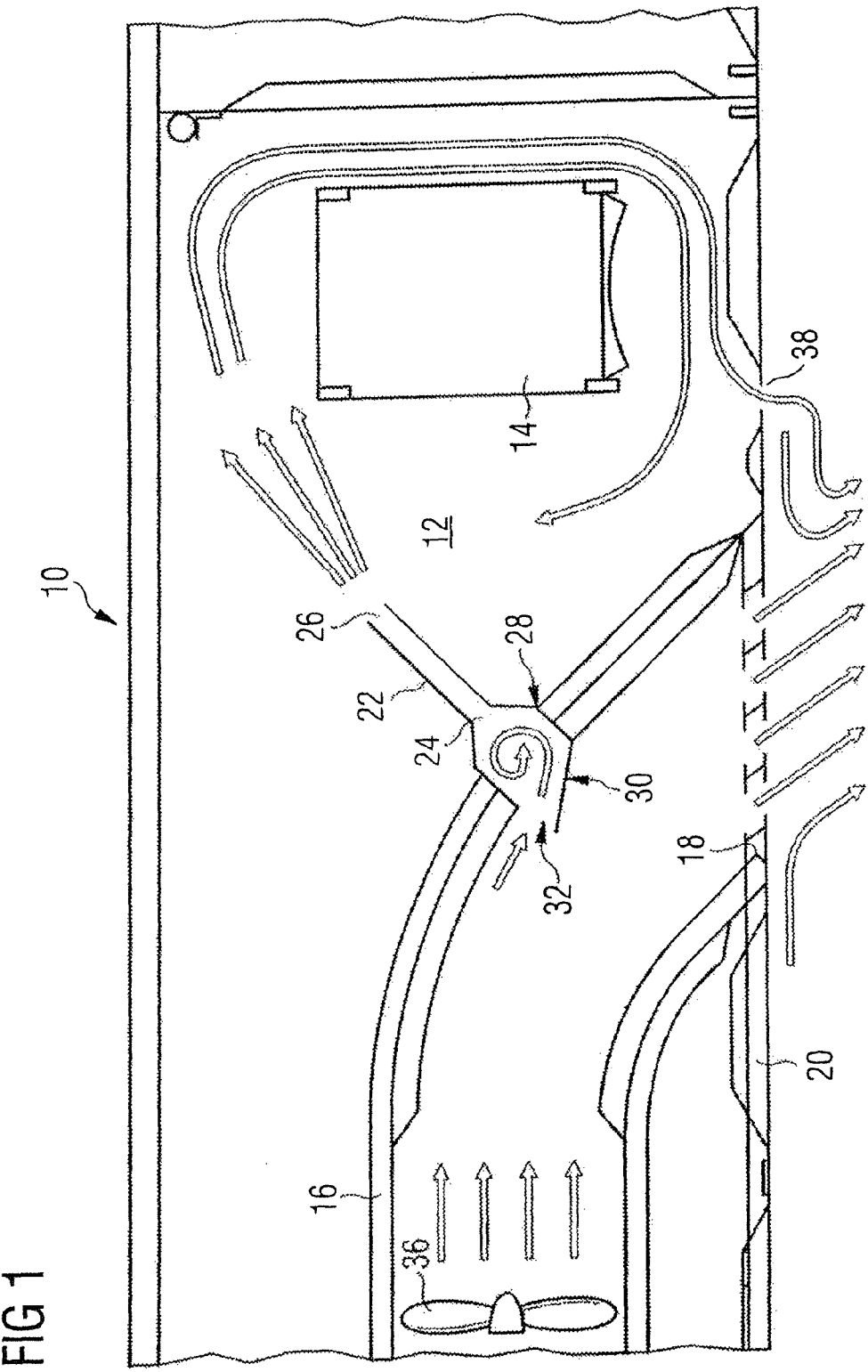

In FIG. 1 a system 10 for ventilating an explosion hazard region 12 of an aircraft is represented. The explosion hazard aircraft region 12 is situated adjacent to fuel tanks of the aircraft, which are not shown in FIG. 1. For this reason, there is a possibility of kerosene vapors penetrating into the region 12. In the aircraft region 12 a thermally loaded component 14 in the form of a control unit is disposed. In order to prevent the formation of an explosive gas mixture in the region 12 and hence minimize the risk of a fuel explosion, the explosion hazard aircraft region 12 has to be adequately ventilated. The thermally loaded component 14 moreover generates a high heat load that has to be removed from the aircraft region 12.

The ventilation system 10 comprises a ram-air channel 16, which has an air inlet, which is not shown in FIG. 1 and is designed in the form of an NACA inlet, for feeding ambient air into the ram-air channel 16. The air inlet of the ram-air channel 16 is formed, as is an air outlet 18, in an outer skin 20 of the aircraft. The ram-air channel 16 is used to feed ram air and hence cooling energy to condensers of a refrigerating machine of an aircraft cooling system.

Figure 2:
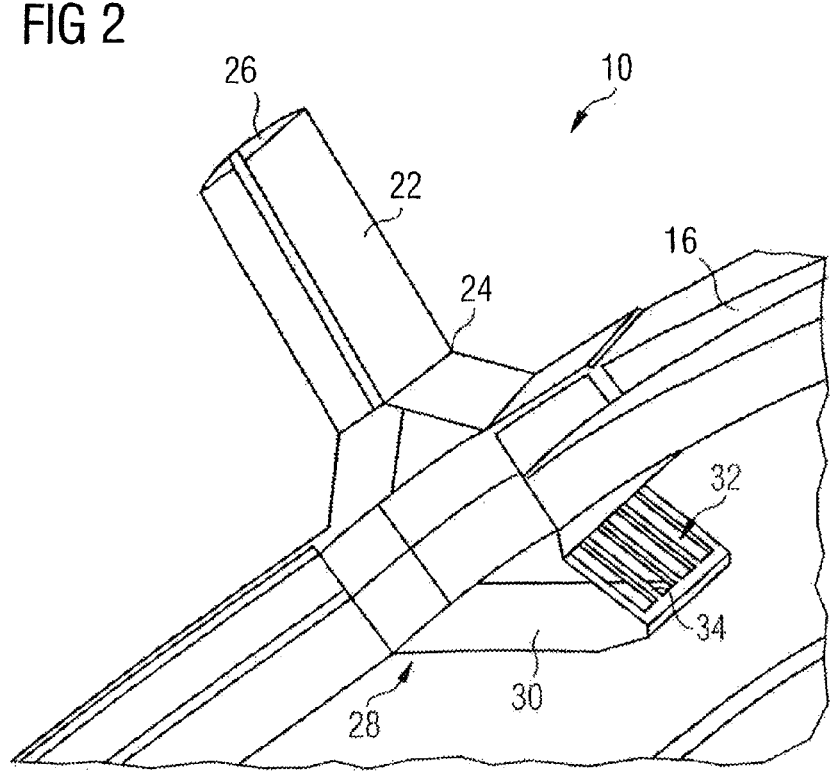

Branching off from the ram-air channel 16 is a ventilation line 22. The ventilation line 22 comprises an air inlet 24 as well as an air outlet 26 and is designed in the faun of a relatively narrow, elongate nozzle that extends substantially over the entire width of the ram-air channel 16, which has a substantially rectangular cross section (see FIG. 2). The air outlet 26 of the ventilation line 22 opens out into the aircraft region 12 to be ventilated, so that air flowing through the ram-air channel 16 may be directed through the ventilation line 22 into the region 12 to be ventilated.

An accumulator 28, which is disposed between the ram-air channel 16 and the air inlet 24 of the ventilation line 22, is used to convert the dynamic pressure of the air flow conveyed through the ram-air channel 16 at least partially into static pressure. As is evident in particular from FIG. 2, the accumulator 28 comprises an air scoop 30 that is incorporated into a wall of the ram-air channel 16. An air inlet area 32 of the accumulator 28 is aligned substantially at right angles to the direction of flow of the air flowing through the ram-air channel 16 and faces towards the air flow. A grid 34 disposed in the region of the air inlet area 32 of the accumulator 28 ensures a suitable flow control in the region of the air inlet area 32 of the accumulator 28.

The accumulator 28 is so designed that by virtue of the conversion of at least a part of the dynamic pressure of the air flow conveyed through the ram-air channel 16 into static pressure a pressure loss arising in the ventilation line 22 is substantially compensated. This enables an air feed into the ventilation line 22 that is sufficient to realize an air exchange rate of 5 times per minute in the aircraft region 12 to be ventilated. The flow in the accumulator 28 is moreover steadied so that a better rectification and hence a uniform distribution of the flow over the entire width of the ventilation line 22 may be achieved. Finally, the air scoop 30 of the accumulator 28 is dimensioned in such a way that the air fed to the accumulator 28 may be removed substantially from an air layer flowing along the ram-air channel wall and so the core flow of the air flow conveyed through the ram-air channel 16 is not disturbed.

Upstream of the accumulator 28 a fan 36 is disposed in the ram-air channel. The fan is used during operation of the aircraft on the ground to generate a necessary air flow through the ram-air channel 16. Where necessary, the fan 36 may of course also be activated during cruising of the aircraft. It is however not designed to ensure an adequate air flow rate through the ventilation line 22 but is used merely to feed air to the component of the aircraft refrigerating machine that is to be cooled. The air flow through the ventilation line 22 is controlled substantially by the accumulator 28 as well as by the design of the inlet openings into the air scoop 30.

After flowing through the aircraft region 12 the air fed through the ventilation line 22 to the region 12 has to be blown out of the region 12 in order to guarantee the required high air exchange rate of 5 per minute as well as an adequate removal of heat from the thermally loaded component 14. The removal of air from the region 12 is effected through an air discharge opening 38 formed in the aircraft outer skin 20. The air discharge opening 38 is formed in the aircraft outer skin 20 adjacent to the air outlet 18 of the ram-air channel 16. The high exit speed of the air from the air outlet 18 of the ram-air channel 16 leads to the generation of a vacuum in the region of the air outlet 18 of the ram-air channel 16. Consequently, an injection flow is induced, by means of which air is sucked out of the aircraft region 12 through the air discharge opening 38. Thus, the arrangement of the air discharge opening 38 adjacent to the air outlet 18 of the ram-air channel 16 promotes the flow of air out of the explosion hazard region 12.

The invention claimed is:

1. A ventilation system for ventilating a region of an aircraft, comprising:
    a ram-air channel comprising:
        an air inlet for feeding ambient air into the ram-air channel;
        an air outlet; and
        a ram-air channel wall,
        wherein the ram-air channel is configured to feed air to a device that is to be cooled on board the aircraft, and
        wherein an air flow in the ram-air channel flows in a direction substantially parallel to the ram-air channel wall
    a ventilation line comprising:
        an air inlet for feeding a partial portion of the air taken from the air flow through the ram-air channel into the ventilation line;
        an air outlet,
        wherein the ventilation line is configured to feed air to the region of the aircraft that is to be ventilated; and
    an accumulator disposed between the ram-air channel and the air inlet of the ventilation line and also located to extend through the ram-air channel wall so as to divert the partial portion of the air into the accumulator from a remainder of air flow conveyed through the ram-air channel wherein the accumulator comprises an air scoop that is incorporated into and extends from the ram-air channel wall,
    wherein the accumulator is configured to convert a dynamic pressure of the diverted air at least partially into static pressure.

2. The ventilation system according to claim 1, wherein the accumulator is configured such that a pressure loss arising in the ventilation line during operation of the ventilation system is substantially compensated by the accumulator converting the dynamic pressure of the air flow conveyed through the ram-air channel at least partially into static pressure.

3. The ventilation system according to claim 1, wherein an air inlet area of the air scoop is aligned substantially perpendicular to a direction of flow of the air flowing through the ram-air channel and faces towards the air flow.

4. The ventilation system according to claim 1, further comprising:
    a fan that is disposed upstream of the accumulator in the ram-air channel.

5. The ventilation system according to claim 1, further comprising:
    at least one air discharge opening provided to the region of the aircraft to be ventilated and configured for removing into the environment the air fed through the ventilation line into the region to be ventilated,
    wherein the air discharge opening is disposed in a region of an aircraft outer skin that is adjacent to the air outlet of the ram-air channel such that an air flow exiting from the ram-air channel induces an injection flow that draws air out of the region of the aircraft to be ventilated through the at least one air discharge opening.

6. The ventilation system according to claim 5, wherein the air outlet of the ram-air channel is larger than the at least one air discharge opening such that the injection flow causes air exchange within the region of the aircraft to be ventilated about 5 times per minute.

7. The ventilation system according to claim 1, wherein the region of the aircraft to be ventilated is an explosion hazard region that adjoins an aircraft fuel tank.

8. The ventilation system according to claim 1, wherein the air in the region of the aircraft to be ventilated is exchanged with air from the ventilation line about 5 times per minute.

9. The ventilation system according to claim 1, wherein a cross-sectional area of the accumulator in the air-ram channel wall is larger than a cross-sectional area of the ventilation line.

10. The ventilation system according to claim 1, wherein the ventilation line defines a nozzle at the point where the ventilation line connects to the accumulator.

11. A ventilation method of ventilating a region of an aircraft, comprising:
    feeding ambient air through a ram-air channel to a device that is to be cooled on board the aircraft, wherein an air flow through the ram-air channel flows in a direction substantially parallel to a wall of the ram-air channel;
    diverting a partial portion of the air from the air flow through the ram-air channel to feed into an accumulator disposed between the ram-air channel and an air inlet of a ventilation line leading into the region of the aircraft that is to be ventilated, the accumulator located to extend through the ram-air channel wall to enable diversion of the partial portion of the air from a remainder of air flow conveyed through the ram-air channel wherein diverting the partial portion of the air from the air flow further comprises:
    capturing the partial portion of the air and dividing the partial portion of the air from the remainder of air flow conveyed through the ram-air channel using an air scoop of the accumulator, with the air scoop incorporated into and extending from the ram-air channel wall;
    converting, in the accumulator, a dynamic pressure of the diverted partial portion of the air flow at least partially into static pressure; and
    feeding the partial portion of the air flow having the dynamic pressure at least partially converted into static pressure from the accumulator into the ventilation line and into the region of the aircraft that is to be ventilated.

12. The ventilation method according to claim 11, wherein a pressure loss arising in the ventilation line is substantially compensated by the converting of the dynamic pressure of the air flow conveyed through the ram-air channel at least partially into static pressure.

13. The ventilation method according to claim 11, further comprising:
    generating, with a fan disposed upstream of the accumulator in the ram-air channel, the air flow through the ram-air channel.

14. The ventilation method according to claim 11, further comprising:
    sucking into the environment air from the region of the aircraft to be ventilated through at least one air discharge opening by an injection flow that is induced by an air flow exiting from an air outlet of the ram-air channel, the air outlet of the ram-air channel being adjacent to the air discharge opening so as to form the injection flow.

15. The ventilation method according to claim 14, wherein the air outlet of the ram-air channel is larger than the at least one air discharge opening such that sucking into the environment air from the region of the aircraft to be ventilated causes air exchange within the region of the aircraft to be ventilated about 5 times per minute.

16. A ventilation system for ventilating a region of an aircraft that is an explosion hazard region that adjoins an aircraft fuel tank, comprising:
    a ram-air channel comprising:
        an air inlet for feeding ambient air into the ram-air channel;
        an air outlet; and
        a ram-air channel wall,
        wherein the ram-air channel is configured to feed air to a devise that is to be cooled on board the aircraft, and
        wherein an air flow in the ram-air channel flows in a direction substantially parallel to the ram-air channel wall;
    a ventilation line comprising:
        an air inlet for feeding a partial portion of the air taken from the air flow through the ram-air channel into the ventilation line;
        an air outlet;
        wherein the ventilation line is configured to feed air to the region of the aircraft that is to be ventilated; and
    an accumulator disposed between the ram-air channel and the air inlet of the ventilation line and also located to extend through the ram-air channel wall so as to divert the partial portion of the air into the accumulator from a remainder of air flow conveyed through the ram-air channel wherein the accumulator comprises an air scoop that is incorporated into and extends from the ram-air channel wall,
    wherein the accumulator is configured to convert a dynamic pressure of the diverted air at least partially into static pressure, and
    wherein the air fed into the accumulator is removed from an air layer flowing along the ram-air channel wall and a core flow of the air flow is undisturbed.

\* \* \* \* \*